(No Model.)　　　　　　　　　　　　　　　　　2 Sheets—Sheet 1.
A. M. LANE.
BALANCE ESCAPEMENT.

No. 593,849.　　　　　　　　　　Patented Nov. 16, 1897.

Witnesses　　　　　　　　　　　　　　　　Inventor
　　　　　　　　　　　　　　　　　　　　Almeron M Lane
　　　　　　　　　　　　　　　　　By James Shepard.
　　　　　　　　　　　　　　　　　　　　Atty.

(No Model.) 2 Sheets—Sheet 2.

A. M. LANE.
BALANCE ESCAPEMENT.

No. 593,849. Patented Nov. 16, 1897.

Witnesses
A. W. Stipek
P. Kegan

Inventor
Almeron M. Lane.
By James Shepard.
Att'y.

UNITED STATES PATENT OFFICE.

ALMERON M. LANE, OF MERIDEN, CONNECTICUT.

BALANCE-ESCAPEMENT.

SPECIFICATION forming part of Letters Patent No. 593,849, dated November 16, 1897.

Application filed April 16, 1897. Serial No. 632,455. (No model.)

*To all whom it may concern:*

Be it known that I, ALMERON M. LANE, a citizen of the United States, residing at Meriden, in the county of New Haven and State of Connecticut, have invented certain new and useful Improvements in Clock-Pallets, of which the following is a specification.

My invention relates to improvements in clock-pallets; and the chief object of my improvement is to produce the pallets of a clock from drawn wire, whereby they may be cheaply and correctly formed, so as to produce an efficient clock.

Figure 1:
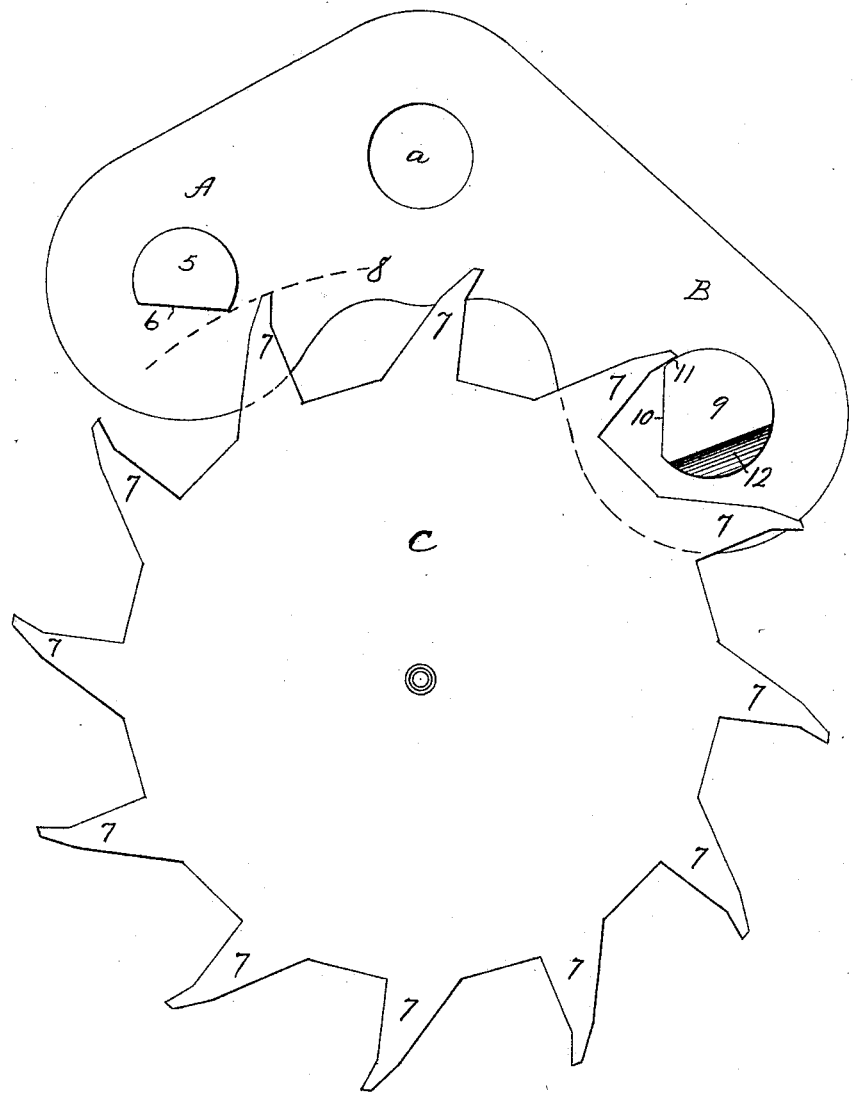
Figure 2:
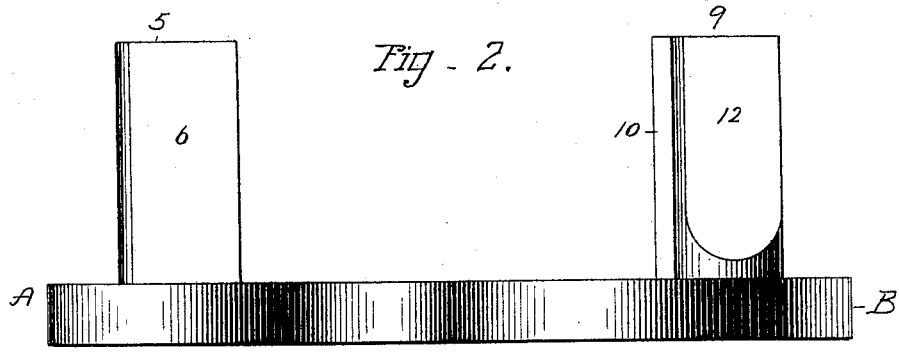
Figure 3:
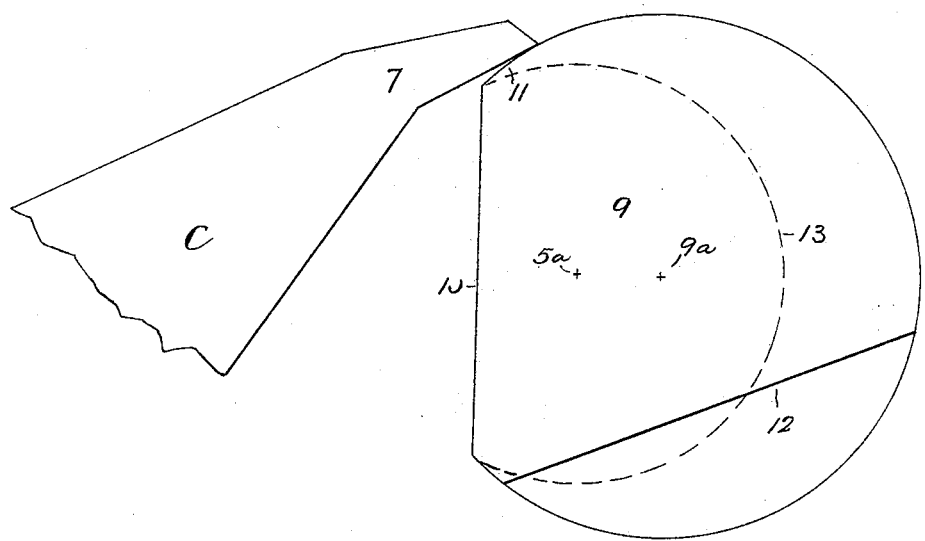
Figure 4:
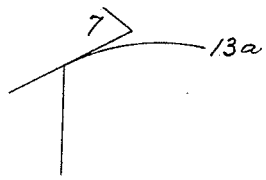

In the accompanying drawings, Figure 1 is a side elevation of my pallets in connection with the scape-wheel of a clock, showing their proper relations to each other. Fig. 2 is a reverse plan view of the pallets and pallet-arms. Fig. 3 is an enlarged front elevation of the delivery-pallet and one tooth of the scape-wheel, and Fig. 4 is a diagram illustrating the acting faces of a scape-wheel tooth and portion of a pallet with an improperly-formed locking-face.

I have not represented the pivotal post for the pallets, as it may be of any ordinary construction and can readily be inserted in the orifice $a$, Fig. 1, the center of which orifice forms the axis of my pallet-arms A and B. I form both of the pallets from round drawn wire and insert them in the pallet-arms A and B in any proper manner. The entrance-pallet 5 is provided with the driving-face 6, formed by slabbing off one side of the wire and leaving the remainder of the periphery in its original round form. This pallet of itself is of an ordinary construction. I have shown it in the drawings in the position it has when one of the teeth 7 of the scape-wheel C has just cleared it, and in order to more clearly illustrate this I have drawn in broken lines 8 a portion of the path which is described by the points of the scape-wheel teeth. The deliverance-pallet 9 is also formed of round drawn wire, with its driving-face 10 formed by slabbing off or removing a portion of the wire, as shown; but instead of taking a wire or rod of the same diameter as that from which the entrance-pallet 5 is formed I employ a wire of considerably larger diameter, so that the driving-face 10 stands at the proper angle or relation to the locking-face 11, which locking-face is formed by the original surface of the round drawn wire. This larger diameter of the wire makes it necessary that I shall also remove a portion of the periphery upon the side opposite the locking-face 11 to form the clearance-face 12, in order to give the pallet sufficient clearance for entering the space between the teeth of the scape-wheel. It is well known in horology that in order to give the proper "draw" the teeth of the scape-wheel should lock on the locking-face of the deliverance-pallet by its point or end only. I accomplish this by forming the pallet 9 of wire whose diameter is large enough to sustain the relation to the face 10 herein shown, whereby the confronting face of the scape-wheel teeth 7 and the locking-face are nearly, but not quite, parallel when the point of each tooth first rests upon the locking-face, as shown in Figs. 1 and 3. The face 10, which is a chord of the circle represented by the periphery of the wire, is of the same length as the driving-face 6 in the pallet 5; but it will readily be seen that although both of these faces are of the same length and are chords of the circle of the wire, the different diameters of the wire bring said faces into different relations to their adjacent peripheral portion. In order to more clearly show this difference, I have represented in Fig. 3 by broken lines the circle 13, which indicates the size of the wire of which the entrance-pallet 5 is formed, and I have represented the center of this circle by the $+ 5^a$, while the center of the circle of the pallet 9 is represented by the $+ 9^a$. It will readily be seen that if a rod or wire of the smaller diameter were employed, the tooth of the scape-wheel would not lock on its point, but would lock upon its face inside of the point, as represented by the broken circle 13 in Fig. 3 and as more clearly shown by the diagram Fig. 4, in which the broken circle 13 is represented by full line $13^a$. The pallet thus formed is of an incorrect construction and is found inefficient in practice; but by forming the pallet of a larger wire to bring the locking-face 11 into the relation to the driving-face 10 shown in Fig. 3 the construction is correct, and the clock is in every way efficient in so far as the pallets of the scape-wheel are concerned, and at the same time I have all the advantages incident to making the pallets from drawn wire.

I claim as my invention—

1. A pallet having a locking-face forming a part of the circumference of a round wire or rod, and a driving face or plane relatively arranged thereto, so that the scape-wheel teeth will always lock upon said locking-face by its point, substantially as described and for the purpose specified.

2. A pallet having a locking-face formed by the periphery of a round rod, a driving-plane extended from said locking-face, and a clearance-face upon the side of said wire which is opposite the locking-face, substantially as described and for the purpose specified.

3. The pallets for a clock, mounted upon suitable arms, the entrance-pallet of which is formed of a round wire with a driving-face upon one side, and the deliverance-pallet of which is formed of round wire of a larger diameter with a driving-face of the same length and with a portion of the periphery adjoining the said driving-face forming the locking-face for being acted upon by the point of the scape-wheel teeth, substantially as described and for the purpose specified.

ALMERON M. LANE.

Witnesses:
JAMES SHEPARD,
A. W. STIPEK.